United States Patent [19]
Oshiro

[11] Patent Number: 5,918,627
[45] Date of Patent: Jul. 6, 1999

[54] SAFETY VALVE

[75] Inventor: Mitsuru Oshiro, Tochigi, Japan

[73] Assignee: Komatsu Ltd., Tokyo, Japan

[21] Appl. No.: 09/101,816

[22] PCT Filed: Mar. 7, 1997

[86] PCT No.: PCT/JP97/00724

§ 371 Date: Jul. 16, 1998

§ 102(e) Date: Jul. 16, 1998

[87] PCT Pub. No.: WO97/33110

PCT Pub. Date: Sep. 12, 1997

[30]       Foreign Application Priority Data

Mar. 7, 1996  [JP]  Japan ................................... 8-050261

[51] Int. Cl.$^6$ ................................................ F16K 31/122
[52] U.S. Cl. ................ 137/508; 251/50; 251/52
[58] Field of Search ........................ 251/52, 50; 137/508

[56]              References Cited

U.S. PATENT DOCUMENTS

| 4,682,531 | 7/1987 | Mayer ................................. | 251/52 X |
| 5,118,076 | 6/1992 | Homes ................................. | 251/50 X |
| 5,451,030 | 9/1995 | Reglebrugge et al. ............... | 251/52 X |

FOREIGN PATENT DOCUMENTS

| 56-173263 | 12/1981 | Japan . |
| 4-7776 | 1/1992 | Japan . |

Primary Examiner—Stephen M. Hepperle
Assistant Examiner—John Bastianelli
Attorney, Agent, or Firm—Frishauf, Holtz, Goodman, Langer & Chick

[57]         ABSTRACT

A safety valve of the type that includes a sleeve (1) with a high pressure port (11) and a low pressure port (12); a valve seat (2) and a poppet (3), both slidably inserted in the sleeve and adapted to be brought together to provide a valve interface that is capable of establishing and blocking a fluid communication between the high pressure port and the low pressure port; and a spring (7) adapted to force the poppet against the valve seat, wherein a difference in force between a fluid pressurized in the high pressure port acting on a pressure receiving surface of the poppet and the spring acting against said pressurized fluid urges the poppet to open the valve interface, thereby relieving the high pressure port by a portion of the pressurized fluid admitted out thereof into the low pressure port. The safety valve comprises a damper chamber (A) formed between the sleeve and the valve seat mentioned above, whose volume is reduced by a sliding movement of the valve seat against the action of the above mentioned spring; and a constriction adapted to bring the damper chamber into fluid communication with a low pressure side, the constriction (35) having an area of the fluid communication that is variable in such a way that it may be reduced by a sliding movement of the valve seat against the action of the spring and that it may be increased by a sliding movement in an opposite direction of the valve seat under the action of the spring.

4 Claims, 3 Drawing Sheets

1

SAFETY VALVE

TECHNICAL FIELD

The present invention relates to a safety valve that is adapted for use in a hydraulic circuit such as those for supplying a discharge pressure fluid from a hydraulic pump into a hydraulic motor.

BACKGROUND ART

There has been known in the art a hydraulic circuit for supplying a discharge pressure fluid of a hydraulic pump into a hydraulic motor, in which the discharge pressure fluid of the hydraulic pump is supplied via an operating valve into one of a pair of principal circuits, of which a first is connected to a first port of the hydraulic motor and a second is connected to a second port of the hydraulic motor.

In a hydraulic circuit of this type, it is customary to use a safety valve of modulation type that is designed to make a relief of a portion of fluid of pressure elevated in the first and second principal circuits to ensure that the elevated pressure may not exceed a pre-established pressure, so that when the hydraulic motor is either to start or to stop driving, fluid pressure in the first or second principal circuit which is active may slowly be elevated in order to diminish a shock that can then be disadvantageously brought about therein. Such a safety valve as known in the art, that is capable of performing a modulation operation in which fluid pressure may rapidly be elevated up to a modulation start pressure and after then slowly be elevated up to a preset pressure, is shown in FIG. 1 of the drawings attached hereto.

More specifically, the safety valve has a valve seat 2 slidably inserted in a sleeve 1 in which a poppet 3 is also slidably inserted so that a concave conical surface 5 of the poppet 3 may be thrusted by a spring 4 against a convex conical surface 6 of the valve seat 2 to provide a valve interface. A piston 7 is slidably inserted in the poppet 3 to form a chamber 8 which is in fluid communication via a small opening 9 and via an inner bore 10 of the valve seat 2 with a high pressure port 11 whereas a low pressure port 12 is formed in the sleeve 1.

And, the sleeve 1 is formed at an end thereof with a large diameter section 20 whose open end has a plug 21 securely fitted therewith. The valve seat 2 is shaped to provide a stepped peripheral configuration having a small diameter one end portion 22, a large diameter mid portion 23 and an intermediate diameter opposite end portion 24. The small diameter one end portion 22 is inserted in the plug 21 to fit with an inner surface 21a thereof and is then sealed with a sealing material 25, whereas the large diameter mid portion 23 is inserted in the sleeve 1 to fit with the large diameter section 20 thereof and is then sealed with a sealing material 26. And, the intermediate diameter opposite end portion 24 is inserted in the sleeve 1 to fit with its inner surface 1a. Thus, the valve seat 2 is allowed to axially be slid and be displaceable by a distance L. Besides, the large diameter mid portion 23 and the sleeve 1 are shaped to provide an annular space 27 between the large diameter mid portion 23 and a step portion 1b of the sleeve 1. The annular space 27 is opening to the low pressure port 12 via an interstice 28 between the sleeve inner surface 1a and the intermediate opposite end portion 24, which is here designed to form a damper chamber A.

Let it be assumed that the section in which the valve surface 5 and the seating surface 6 are to be in contact with each other has a diameter d1, the piston 7 has a diameter d2, and the small diameter one end portion 22 of the valve seat 2 has a diameter d3.

An explanation is now given below of an operation of the conventional safety valve whose construction has been described above.

Assuming that the high pressure port 11 has a pressure that ranges between P1 and 0, the spring 4 forces the poppet 3 which in turn pushes the valve seat 2 to cause it to move by the distance L1 leftwards in the Figure to contact with the plug 21. Here, it should be noted that the spring load F1 of the spring 4 is set at a value that is lower than a conventional value by L1×K where K is a spring constant.

Under the state described, if the pressure P1 in the high pressure port 11 is suddenly elevated, the poppet 3 starts sliding rightwards when a thrust force due to the pressure P1 acting on the pressure receiving surface of the poppet 3 with an area $A1=\pi/4\cdot(d_1^2-d_2^2)$ is balanced with the spring load F0 and then causes a section between the valve surface 5 and the seating surface 6, that is, the valve interface to open, thereby permitting a fluid of the elevated pressure to commence being admitted into the low pressure port 12, thus relieving the high pressure port 11. The pressure at this instant is a modulation start pressure.

Then, with the elevated fluid pressure P1 acting on the end surface 2a of an area $A2=\pi/4\cdot(d_3^2-d_1^2)$ of the valve seat 2, the valve seat 2 is placed under a thrust force=A2×P1 to tend to move rightwards. However, also under the action of the damper chamber A, that is, the action in which pressure fluid in the annular space 27 is restricted in its flow by the interstice 28, flowing out of it and gradually into the low pressure port 12, the valve seat 2 must be more slow to move rightwards than the poppet 3. As a consequence, the pressure rises with a reduced slope towards arriving at a preset pressure when the seating surface 6 is urged to contact the valve surface 5.

The pressure of fluid in the high pressure port 11 under such a relief action will thus be to assume a waveform as represented by the solid curve shown in FIG. 2, rising in two stages with a long time elapsed until the preset pressure is reached.

With such a safety valve, it is therefore seen that a drop of pressure in the high pressure port 11 while it is under a relief action causes the poppet 3 and the valve seat 2 to move leftwards with the spring 4, returning to their initial positions. As the valve seat 2 is moved leftwards, fluid in the low pressure port 12 is forced to flow via the interstice 28, sucked into the damper chamber A.

However, since the interstice 28 that must be small and minimum in order to retard the rightward movement of the valve seat 2 impedes the fluid flowing that is sucking into the damper chamber A, the fluid fails to be sucked into the damper chamber A to an extent that is proportionate to the rate at which the valve seat 2 is moving leftwards via the poppet 3 with the spring 4. A negative pressure then is caused in the damper chamber A and gives rise to the formation of air bubbles therein.

The rightward movement of the valve seat 2 produced by rising of pressure again in the high pressure port 11 while air bubbles are formed in the damper chamber A causes the air bubbles to tend to be broken in the damper chamber A, allowing the valve seat 2 to be displaced rightwards quicker than at a rate that is solely governed by the flow restrictive action of the interstice 28. It follows then that a desired length of the time of modulation (i. e., the time elapsed from the instant at which the pressure is at a modulation start pressure until an instant at which the pressure reaches a preset pressure) cannot be achieved.

It can also be seen that since the damper chamber A is in fluid communication with the low pressure port 12 via the interstice 28 between the inner surface 1a of the sleeve 1 and the intermediate diameter opposite end portion 24 of the valve seat 2, a change in the diameter of either of the sleeve 1 and the valve seat 2 as caused by a change in temperature alters the size of the interstice 28. The size of the interstice 28 also fluctuates when the sleeve 1 or the valve seat 2 is eccentric. Such a change or fluctuation in the size of the interstice 28 bars a stabilized time span of modulation from being obtained.

As observed in the foregoing description, it has hitherto been recognized in the art to be difficult to adjust the time of modulation to be sufficiently long while the interstice 28 is kept minimum, which in turn makes it difficult to significantly diminish a shock that is entailed in a hydraulic motor when it is to start or end driving.

It is accordingly an object of the present invention to provide a safety valve which can overcome the problems mentioned above.

SUMMARY OF THE INVENTION

In order to achieve the above mentioned object, there is provided in accordance with the present invention in a certain aspect thereof a safety valve that includes:

a sleeve having a high pressure port and a low pressure port;

a valve seat and a poppet, both slidably inserted in the sleeve and adapted to be brought together to provide a valve interface that is capable of establishing and blocking a fluid communication between the high pressure port and the low pressure port; and a spring adapted to force the poppet against the valve seat, wherein a difference in force between a fluid pressurized in the high pressure port acting on a pressure receiving surface of the poppet and the spring acting against the pressurized fluid urges the poppet to open the valve interface, thereby relieving the high pressure port by a portion of the pressurized fluid admitted out thereof into the low pressure port, and is characterized in that the safety valve comprises:

a damper chamber formed between the said sleeve and the said valve seat and having a volume thereof, wherein a sliding movement of the said valve seat against the action of the said spring reduces the volume of the said damper chamber; and a constriction adapted to bring the said damper chamber into fluid communication with a reduced pressure side, the said constriction having an area of the fluid communication that is variable in such a way that it may be reduced by a sliding movement of the said valve seat against the action of the said spring and that it may be increased by a sliding movement in an opposite direction of the said valve seat under the action of the said spring.

According to the construction mentioned above, it can be noted and should be understood that the constriction which permits fluid in the damper chamber to flow out of it and to a reduced pressure side and of which the area of fluid communication is reduced when the valve seat is slid under a pressure elevated in the high pressure port against the spring action is allowed to slide so slowly, thus causing it to take longer time for the pressure to rise from a relief start pressure up to a preset pressure, hence a prolonged time of the modulation that ensues.

Also, it can be seen and should be appreciated that the constriction through which fluid in the reduced pressure side is sucked into the damper chamber and whose area of communication is increased when the valve seat is slid under the spring force with the pressure reduced in the high pressure port allows the fluid in the reduced pressure side to flow into the damper chamber smoothly, thereby preventing the damper chamber from becoming negative in pressure inside and from producing air bubbles therein.

This provides a pre-established time of modulation that results if the safety valve is brought iteratively into a relief action. Consequently, this safety valve, used in a hydraulic circuit for supplying a pressurized fluid into a hydraulic motor, significantly diminishes a shock which occurs when the motor starts and stops driving.

It is yet possible to further prolong, without any inconvenience suffered, the time of modulation in which the valve seat is even more slowed in its sliding movement with the constriction having the area of fluid communication further reduced when the valve seat is slid against the spring action. But, even so the constriction can have its area of fluid communication enlarged when the valve seat is to be slid under the spring force, without regard to how far the area of fluid communication was then reduced.

By virtue of the fact that a further longer time of modulation does not allow air bubbles to be generated in the damper chamber, this safety valve if operated with a repeated relief action does not fail to effectively operate in any prolonged time of modulation that is necessary and sufficient. Therefore, the safety valve according to the present invention is adapted for use in a hydraulic circuit for supplying a pressure fluid into a hydraulic motor while attaining significant reduction of a shock occurring when the hydraulic motor is starting or stopping a drive.

In the construction described above, it is desirable that the said constriction comprise:

a stepped bore having a small diameter section and a large diameter section;

a ball adapted to be fitted in the said stepped bore; and a spring, which is separate from the first mentioned spring, for thrusting the said ball against the said small diameter section, wherein the said small diameter section is in fluid communication with the said reduced pressure side and the said large diameter section is in fluid communication with the said damper chamber.

According to the construction mentioned above, it can be noted and should be understood that an area of fluid communication as referred to is established by the diameter of the stepped bore and the diameter of the ball. Thus, a constriction with such an area of fluid communication as so established becomes analogous to a sharp edge orifice, presenting no change in constriction property (i. e. area of fluid communication) against a change in temperature. Hence, a stabilized time span of modulation is provided.

In addition to the constructive elements mentioned above, the safety valve according to the present invention may include a piston that is inserted in the said poppet to provide a chamber, a narrow opening that is formed in the said poppet and is in fluid communication with the said high pressure port, and a throughgoing bore that is formed in the said valve seat.

BRIEF DESCRIPTION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention but to facilitate an explanation and understanding thereof.

In the accompanying drawings

BEST MODES FOR CARRYING OUT THE INVENTION

Hereinafter, suitable embodiments of the present invention with respect to a safety valve are set forth with reference to the accompanying drawings hereof.

Figure 1:
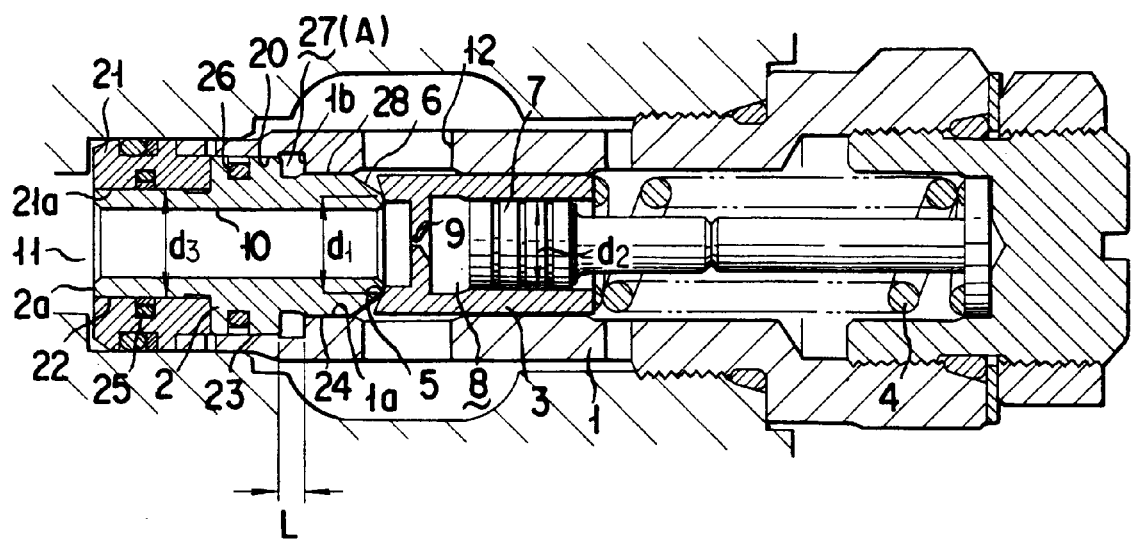
FIG. 1 is a cross sectional view that shows a safety valve in the prior art.
Figure 2:
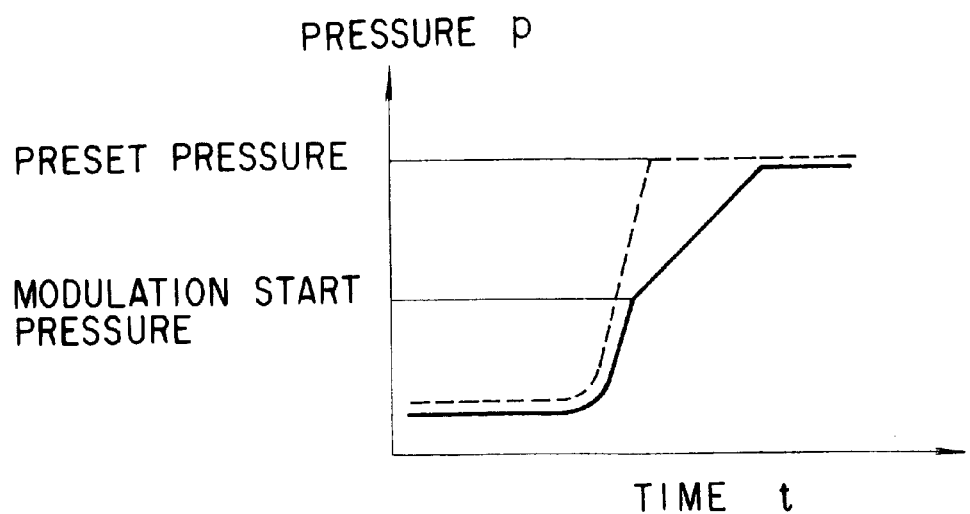
FIG. 2 is a graph that shows relief characteristics of safety valves of modulation type.
Figure 3:
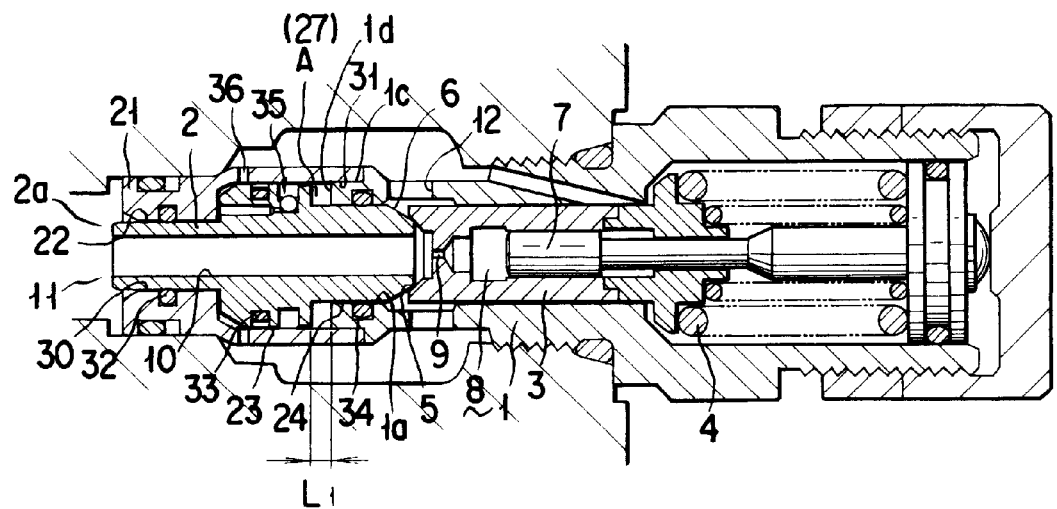
FIG. 3 is a cross sectional view that shows an embodiment of the safety valve according to the present invention.

An explanation is given of an embodiment of the present invention based on FIG. 3. It should be noted that the same components as those in the prior art are designated by the same reference characters and a further explanation of details thereof are here omitted.

A plug 21 is interiorly formed with a bore having a small diameter section 30 and a large diameter section 31. The plug 21 is fitted with an end of the sleeve 1 to fit over an outer peripheral surface 1c thereof in the large diameter bore section 31. The small diameter one end portion 22 of the valve seat 2 formed at one end thereof as mentioned previously is fitted with the small diameter section 30 of the plug 21 interiorly thereof and is sealed thereto with a sealing material 32. The large diameter mid portion 23 of the valve seat 2 is fitted with the large diameter section 31 of the plug 21 interiorly thereof and is sealed thereto with a sealing material 33. The intermediate diameter opposite end portion 24 formed at the other end thereof is fitted with the inner peripheral surface 1a of the sleeve 1 and is sealed thereto with a sealing material 34.

A damper chamber A which is constituted by an annular space 27 is here formed by the large diameter section 31 of the plug 21, an end surface 1d of the sleeve 1 and the intermediate diameter opposite end portion 24 of the valve seat 2 together so as to be in fluid communication via a constriction 35 with an auxiliary low pressure port 36 that is formed in the small diameter bore section 30 of the plug 21.

Figure 4:
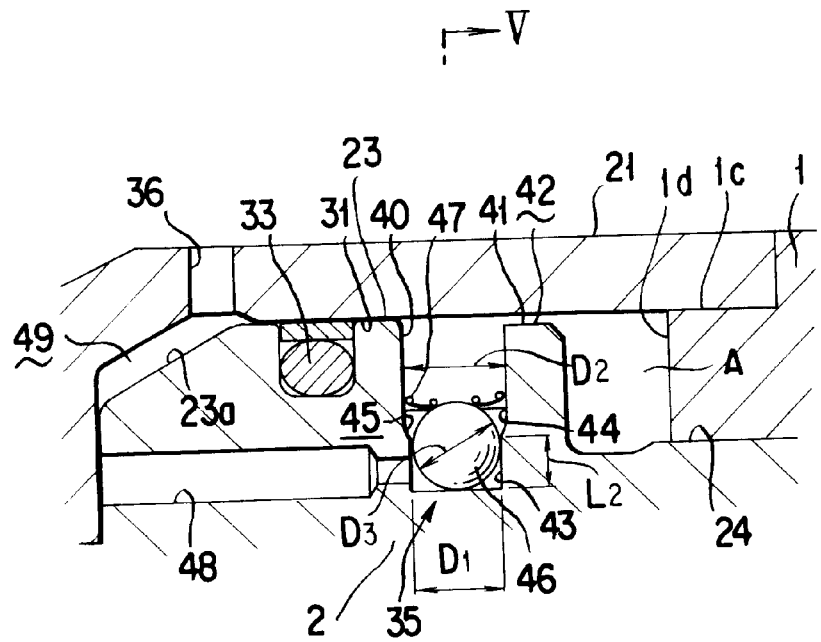
FIG. 4 is an enlarged cross sectional view that shows a constriction in the embodiment shown in FIG. 3.
Figure 5:
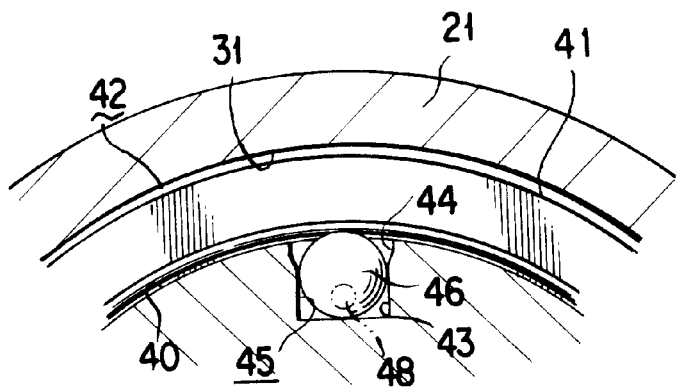
FIG. 5 is a cross sectional view taken along the line V—V in FIG. 4.

Referring to FIG. 4, an explanation is given of a detailed structure of the constriction 35.

The large diameter mid portion 23 of the valve seat 2 is formed with an annular groove 40, and also includes a round portion 41 lying closer to the damper chamber A than the annular groove 40, which is smaller in diameter than the large diameter section 31 of the plug 21. An annular slit 42 is formed between the round portion 41 of the valve seat 2 and the large diameter section 31 of the plug 2 to provide a fluid communication between the damper chamber and the annular groove 40. The annular slit 42 is so much of size that it may not affect the time of modulation.

The annular groove 40 is formed with a stepped bore 45 having a small diameter section 43 and a large diameter section 44 and has a ball 46 fitted therein. In the stepped bore 45, the small diameter section 43 has a diameter D1, the large diameter section 44 has a diameter D2, and the ball 46 has a diameter D3 which is a bit smaller than the diameter D1 of the small diameter section 43. Further, the small diameter section 43 has a depth L2 which is a bit greater than one half (½) of the diameter D3 of the ball 46.

A spring 47 is also provided that is ring shaped and wound fittedly in the annular groove 40 to force the ball 46 against the bottom wall of the stepped bore 45. A fluid bore 48 is further formed which provides a fluid communication of the small diameter section 43 in the stepped bore 45 with the auxiliary low pressure port 36 via a space 49. The space 49 lies between one end surface of the large diameter mid portion 23 of the valve seat 2 and the large diameter bore section 31 of the plug 21 and always communicates with the auxiliary low pressure port 36 via an inclined surface 23a of the large diameter mid portion 23.

An explanation is next given of the operation of the embodiment described.

When the pressure in the high pressure port 11 rises to a modulation commencing pressure, in the same manner as with the conventional safety valve previously described, the poppet 3 is displaced rightwards against the spring action of the spring 4 to commence relieving the high pressure port 11 by pressure fluid admitted out thereof into the low pressure port 12. Thereafter, the valve seat 2 is displaced rightwards under the pressure in the high pressure port 11 to allow fluid in the damper chamber A to flow through the annular slit 42, the annular groove 40, an interstice between the large diameter section 44 and the ball 46 and an interstice between the small diameter section 43 and the ball 46 into the fluid bore 48 and then through the latter and the space 49 into the auxiliary low pressure port 36.

The pressure fluid that flows out of the damper chamber A towards the auxiliary low pressure port 36, in the course of passing through a small interstice provided by the small diameter section 43 and the ball 46 that serves as a restrictor or constrictor, is restricted or constricted in flow with less fluid flow admitted therethrough and out thereof. In other words, a small difference in diameter between the small diameter section 43 and the ball 46 provides a reduced area of fluid communication between the damper chamber A and the auxiliary low pressure port 36, hence a reduced flow of fluid that is admitted into the auxiliary low pressure port 36 from the damper chamber A. This causes the valve seat 2 to be displaced rightwards at a reduced speed, which in turn causes the pressure to rise at a reduced rate up to a preset pressure. Hence, a prolonged time of modulation ensues.

Specifically, a flow constriction as described above is provided by an interstice formed between a circular rim defined by the ball 46 cut by a horizontal plane at a height of its radius as shown and the wall of the small diameter orifice 43. Thus, such a constriction is considered to be essentially equivalent to one in a sharp edge orifice in general, there being no significant change in constrictive characteristics with respect to a change in temperature. It should also be noted that the pressurized fluid passing over the ball 46 to allow it to be rotated serves effectively to expel a foreign matter that may possibly have been entrapped in the interstice.

It can also be seen that if the pressure in the high pressure port 11 is reduced, the valve seat 2 is displaced leftwards under the action of the spring 4. Fluid is then caused to flow through the low pressure port 36, the space 49 and the fluid bore 48 into the small diameter section 43 and then, pushing up the ball 46, to pass through a large interstice created between the large diameter section 44 and the ball 46, flowing into the annular groove 40 and through the latter and the annular slit 42 into the damper chamber A.

The enlarged interstice in this case in which fluid flows in the opposite direction provides a larger area of fluid communication between the low pressure port 36 and the damper chamber A and allows the fluid much more to flow into the damper chamber A without restriction, permitting the seat valve 2 to quickly return to its initial state. Thus, the inside of the damper chamber A is effectively prevented from becoming negative in pressure and hence is freed from a formation of bubbles therein.

There is thus provided a safety valve which may be used in a hydraulic circuit for supplying a hydraulic motor with a pressure fluid whereby a shock occurring when the motor is to start or stop driving is markedly diminished.

While the present invention has hereinbefore been set forth with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the present invention is not intended to be limited to the specific embodiments thereof set out above, but to include all possible embodiments thereof that can be made within the scope with respect to the features specifically set forth in the appended claims and encompasses all the equivalents thereof.

What is claimed is:

1. A safety valve including:

a sleeve having a high pressure port and a low pressure port;

a valve seat and a poppet, both slidably inserted in the sleeve and adapted to be brought together to provide a valve interface that is capable of establishing and blocking a fluid communication between the high pressure port and the low pressure port; and a spring adapted to force the poppet against the valve seat, wherein a difference in force between a fluid pressurized in the high pressure port acting on a pressure receiving surface of the poppet and the spring acting against the pressurized fluid urges the poppet to open the valve interface, thereby relieving the high pressure port by a portion of the pressurized fluid admitted out thereof into the low pressure port, wherein the safety valve comprises:

a damper chamber formed between said sleeve and said valve seat and having a volume thereof, wherein a sliding movement of said valve seat against the action of said spring reduces the volume of said damper chamber; and a constriction adapted to bring said damper chamber into fluid communication with a reduced pressure side, said constriction having an area of the fluid communication that is variable in such a way that it may be reduced by a sliding movement of said valve seat against the action of said spring and that it may be increased by a sliding movement in an opposite direction of said valve seat under the action of said spring.

2. A safety valve as set forth in claim 1, characterized in that said constriction comprises:

a stepped bore having a small diameter section and a large diameter section;

a ball adapted to be fitted in said stepped bore; and a spring, which is separate from the first mentioned spring, for thrusting said ball against said small diameter section, wherein said small diameter section is in fluid communication with said reduced pressure side and said large diameter section is in fluid communication with said damper chamber.

3. A safety valve as set forth in claim 1, further comprising a piston adapted to be inserted into said poppet to provide a chamber; a narrow opening that is formed in said poppet and is in fluid communication with said high pressure port, and a throughgoing bore that is formed in said valve seat.

4. A safety valve as set forth in claim 2, further comprising a piston adapted to be inserted into said poppet to provide a chamber; a narrow opening that is formed in said poppet and is in fluid communication with said high pressure port, and a throughgoing bore that is formed in said valve seat.

* * * * *